United States Patent [19]

Ceroni et al.

[11] Patent Number: 4,795,986

[45] Date of Patent: Jan. 3, 1989

[54] METHOD AND CIRCUIT FOR CARRIER SYNCHRONISM RECOVERY IN PSK COHERENT DEMODULATORS

[75] Inventors: Ettore Ceroni, Bergamo; Michelangelo Lo Curto, Milan, both of Italy

[73] Assignee: GTE Telecomunicazioni, S.p.A., Milan, Italy

[21] Appl. No.: 121,562

[22] Filed: Nov. 16, 1987

[30] Foreign Application Priority Data

Dec. 5, 1986 [IT] Italy .................. 22584 A/86

[51] Int. Cl.$^4$ .................................. H03D 3/00
[52] U.S. Cl. ............................ 329/124; 375/82; 375/88
[58] Field of Search .......... 329/50, 124; 331/12; 375/81, 82, 88; 455/209, 214, 260, 265

[56] References Cited

U.S. PATENT DOCUMENTS 4,255,713  3/1981  Yoshida .................. 329/124 X

OTHER PUBLICATIONS

AFC Tracking Algorithms, Francis D. Natali; IEEE Transactions on Communications, vol. COM-32, No. 8, Aug. 1984; pp. 935-947.
Theory of False Lock in Costas Loops, Jack Holmes, William C. Lindsey, and Kait Woo; IEEE Communications, vol. COM-26, No. 1, Jan. 1978; pp. 5-12.
On False-Lock Phenomena in Carrier Tracking Loops, Tadao Shimamura; IEEE Transactions on Communications, vol. COM-28, No. 8, Aug. 1980; pp. 1326-1334.
Allias Lock Behavior of Sampled-Data Costas Loops; Marvin K. Simon, and Kait Woo; IEEE Transactions on Communications, vol. COM-28, No. 8, Aug. 1980; pp. 1315-1325.

Primary Examiner—Eugene R. LaRoche
Assistant Examiner—Robert J. Pascal
Attorney, Agent, or Firm—Jeffrey P. Morris

[57] ABSTRACT

A circuit and method for the acquisition of carrier synchronism in coherent demodulators which operate with carriers modulated by Phase-Shift Keying (PSK). The invention makes use of simple, low-cost circuitry and gives the phase-lock loop of the demodulator an added frequency characteristic which prevents false locks and ensures lock between the local carrier and the reference signal even for very large frequency variations.

11 Claims, 4 Drawing Sheets

METHOD AND CIRCUIT FOR CARRIER SYNCHRONISM RECOVERY IN PSK COHERENT DEMODULATORS

BACKGROUND OF THE INVENTION

1. Field of the Invention

The present invention relates to the field of digital signal transmissions and more specifically to a process for the acquisition of carrier synchronism in coherent demodulators which receive at their input a modulated signal which is divided in two signals which are multiplied respectively by two quadrature carriers, the resulting signals being then added and substracted to obtain a plurality of signals.

2. Description of the Prior Art

It is known that digital radio signal receivers include demodulators and that to demodulate such signals, generally modulated by the Phase Shift Keying (PSK) technique, it is necessary to reconstruct on the basis of the information contained in the received signals a local carrier identical to the one that was suppressed in the transmitted signals.

Among the methods used for reconstruction of the local carrier, the most widely used are derived from the Costas loop technique and generate the carrier by the use of a local voltage controlled oscillator (VCO) inserted in a phase-locked loop (PLL).

The Costas loop technique has the serious drawback of making possible false locks, i.e. it can happen that the phase-lock loop finds stable points of equilibrium even for particular frequency values of the local oscillator which do not correspond to the input signal frequency, making demodulation of the input signal impossible.

Another limitation of the prior art Costas loop technique and of all known demodulation systems which use a phase comparator for carrier locks is the limited capture range.

As is known, the capture range of a phase-lock loop is given by the maximum frequency difference (Δf) between the output signal frequency of the local oscillator in the absence of a reference signal and the output signal frequency from the same local oscillator which permits the loop to achieve phase lock in the presence of a reference signal. Because of this limitation it is necessary to equip the phase-lock loop with search devices to increase the capture range thereof.

In the article of G. L. Hedin, J. K. Holmes, W. C. Lindsey and K. T. Woo entitled "Theory of False Lock in Costas Loops" published in IEEE Transactions on Communications, Vol. COM-26, No. 1, January 1978, the authors examine some of the causes which bring about false locks and show that the $\Delta f_i$ frequencies at which they can occur have values which are a multiple of the symbol frequency fs divided by the number of the modulation phases in accordance with the formula:

$\Delta f_i = n \cdot f_s/m$, where n=1, 2, . . . and, in case of Quadrature Phase-Shift Keying (QPSK), m=4.

In the aforementioned IEEE article it is shown that the spectral distribution of the error signal in lock condition is different depending on whether the lock is true or false. In particular the components at multiple frequencies of the symbol frequeny have different amplitude. The process proposed to achieve correct lock consists first of detecting the presence of false locks by measurement of the amplitude of the aforesaid components and then forcing the phase-lock loop into the correct lock condition. The proposed process is rather complicated, the hardware implementation is difficult to accomplish and in particular it does not always assure correct operation.

In other published articles there is introduced a parameter called 'False-Lock Margin' represented by the ratio between the continuous component of the error signal under true lock conditions and the continuous component of the error signal in the different possible conditions of false lock, dependent in value on the transmission channel band. It can be observed and experimentally confirmed that the false lock margin is extremely reduced in QPSK systems, in which the first false lock takes place for $\Delta f_i = /4$.

This suggests another process for avoiding false locks which consist of limiting the range of the local oscillator to values lower than ±fs/8. In this manner all false locks would be avoided.

However, this solution is not always practicable especially in small-capacity systems for which the term fs/8 can be a very small fraction of the nominal carrier frequency. Indeed, in these systems, because of the instability of the local oscillator, transmission oscillator and local oscillator, of the converters contained in the transceiver, the nominal value of the input signal frequency has a certain indefiniteness which can be greater than fs/8.

Hence the above identified process widely used for medium and large capacity systems is unsuitable for small-capacity systems unless sophisticated and costly very-high stability oscillators are adopted.

Another known process proposed for extending the capture range in QPSK demodulators derived from the Costas loop is described in the article by F. D. Natali entitled "AFC Tracking Algorithms" published in IEEE Transactions on Communications, Vol. COM-32 No. 8, August 1984 and which consists of utilizing a phase-frequency comparator.

The aforementioned proposed solution is complex in terms of hardware implementation, requiring the use of linear multipliers and analog-to-digital converters difficult to use in small-capacity systems where low cost and small size are of primary importance.

The object of the present invention is to overcome the aforementioned drawbacks and to provide a process for acquisition of carrier synchronism in coherent demodulators which by making use of a simple and low-cost hardware implementation, gives the phase-lock loop of the demodulator an added frequency characteristic. Such an added frequency characteristic ensures locking between the local carrier and the carrier (suppressed) of the received signals, avoiding false locks, and also ensures a sufficiently wide capture range.

SUMMARY OF THE INVENTION

The present invention describes a process for the acquisition of the carrier synchronism in coherent demodulators which receive at their input a modulated signal which is divided into two signals which are multiplied by two quadrature carriers, the resulting signals being then added together and subtracted from each other to obtain a plurality of signals characterized in that at least a first and a second signal among the plurality of signals are sampled with a first frequency while at least a third and fourth signal among the plurality of signals are sampled with a second frequency which is an even multiple of the first frequency.

The foregoing and other objects and advantages of the present invention will become apparent with reference to the following detailed description of the invention and the annexed drawings wherein:

DESCRIPTION OF THE PREFERRED EMBODIMENT

Figure 1:
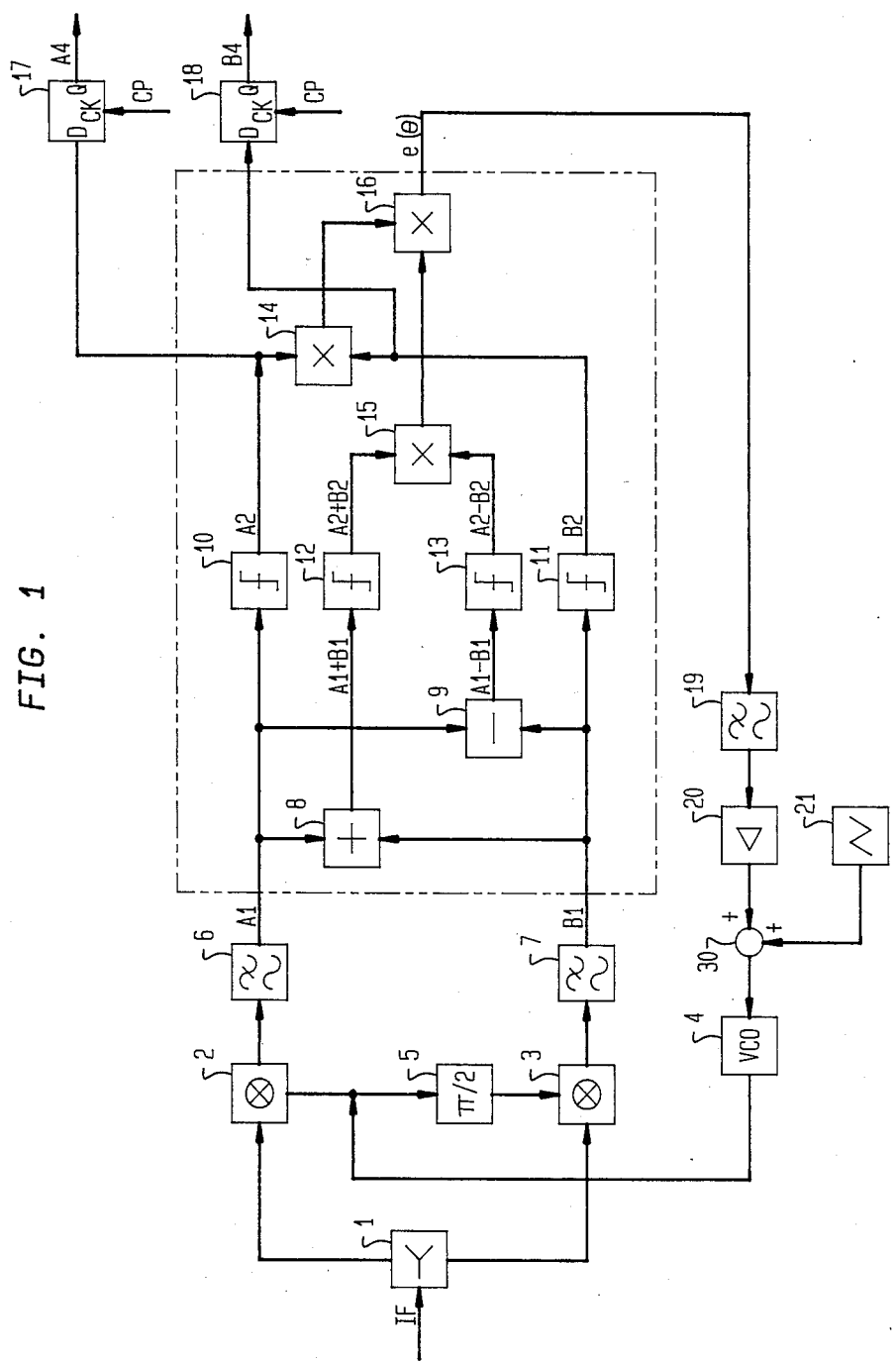
FIG. 1 shows a block diagram of a demodulator in accordance with the known prior art.

FIG. 1 represents a Quadrature Phase-Shift Keying (QPSK) or Offset Quadrature Phase-Shift Keying (O-QPSK) demodulator of the Costas loop type in which 1 indicates a splitter at the input of which is presented a modulated reception signal IF and the outputs of which are connected to the first input of a multiplier 2 and to the first input of a multiplier 3 respectively.

The output signal of a voltage-controlled local oscillator 4 is coupled to the second input of the multiplier 2. Said signal, through a 90 degree phase shifter 5, also is coupled to the second input of the multiplier 3.

The output of the multiplier 2 is connected to the input of a low-pass filter 6, the output of which is connected to an input of an adder 8, to an input of a subtractor 9 and to the input of a slicer 10. The output of the multiplier 3 is connected to the input of a low-Pass filter 7 the output of which is connected to the second input of the adder 8, to the second input of the subtractor 9 and to the input of a slicer 11.

The output of the adder 8 is connected to the input of a slicer 12 while the output of the subtractor 9 is connected to the input of a slicer 13. The output of the slicer 10 is connected to an input of a multiplier 14 and to the input D of a flip-flop 17 while the output of the slicer 11 is connected to the other input of the multiplier 14 and to the input D of a flip-flop 18.

The outputs of the slicers 12 and 13 are connected to the two inputs of a multiplier 15. The outputs of the two multipliers 14 and 15 are connected to the two inputs of a multiplier 16 the output of which is connected to the input of a low-pass filter 19. The output of the filter 19 is connected to the input of an amplifier 20 the output of which is connected to the first input of an adder 30 to the second input of which is connected the output of a block 21. the output of the adder 30 is connected to the control input of the local oscillator 4.

As is known, in operation the intermediate frequency IF signal is split by the splitter 1 to a first input of each of the multipliers 2 and 3. The output signal of the local oscillator 4 arrives at the second input of the multiplier 2. The output signal of the local oscillator 4 phase shifted 90 degrees by the phase shifter 5, is coupled to the second input of the multiplier 3.

The demodulated signals at the outputs of the multipliers 2 and 3 pass through the low-pass filters 6 and 7, which serve primarily to reduce the noise present in the demodulated signal band and are indicated by $A_1$ and $B_1$ respectively. Through the adder 8 and the subtractor 9, the two signals $A_1$ and $B_1$ are added together and subtracted from each other, generating the signals A1+B1 and A1−B1 respectively. The four signals A1, B1, A1+B1 and A1−B1 through the slicers 10, 11, 12 and 13 are digitized, generating four streams of digitalized data respectively A2, B2, A2+B2 and A2−B2.

The signals A2 and B2 are coupled to the input D of the samplers 17 and 18 respectively to the clock input CK at which a clock signal CP taken from the demodulated signal A1 or B1 or from the received signal IF is coupled. The samplers 17 and 18 regenerate the signals A2 and B2, reconstructing the data streams transmitted and indicated by A4 and B4 respectively.

The signals A2 and B2 are also multiplied together by means of the multiplier 14. The signals A2+B2 and A2−B2 are multiplied together by means of the multiplier 15. The output signals from the multipliers 14 and 15 are further multiplied together by the multiplier 16, the output signal of which is the error signal $e(\theta)$.

The signals A2, B2, A2+B2 and A2−B2 are digital on two levels. The multipliers 14, 15 and 16 are logical gates which accomplish the Exclusive-Or function.

The blocks enclosed by the broken line of FIG. 1 illustrate a phase comparator of the Costas loop type the output signal of which $e(\theta)$ represents the phase error signal for control of the local oscillator 4 and where $\theta$ is the phase shifting angle between the local carrier and the modulation carrier. The information on the modulation carrier phase is then taken from the signals A1 and B1 and the function $e(\theta)$ is null only when the local carrier phase coincides with that of the modulation carrier.

The low-pass filter 19 extracts the continous component present in the error voltage $e(\theta)$. This component, after being amplified by the amplifier 20, is applied to the first input of the adder 30, and to the second input of which is coupled the output signal of the block 21. The output signal of the adder 30 is applied to the control input of the local oscillator 4 to allow it to achieve phase lock with the modulation carrier, keeping this condition steady.

The block 21 is a known device for seeking lock which permits extending the capture range and consists primarily of a saw-tooth-waveform oscillator which, when the phase-lock loop is unlocked, periodically varies the frequency of the voltage controlled local oscillator 4 over its entire scanning range. When the lock has taken place the loop reacts to counterbalance the output voltage of the saw-tooth-waveform oscillator and cancel out its effect.

Figure 2:
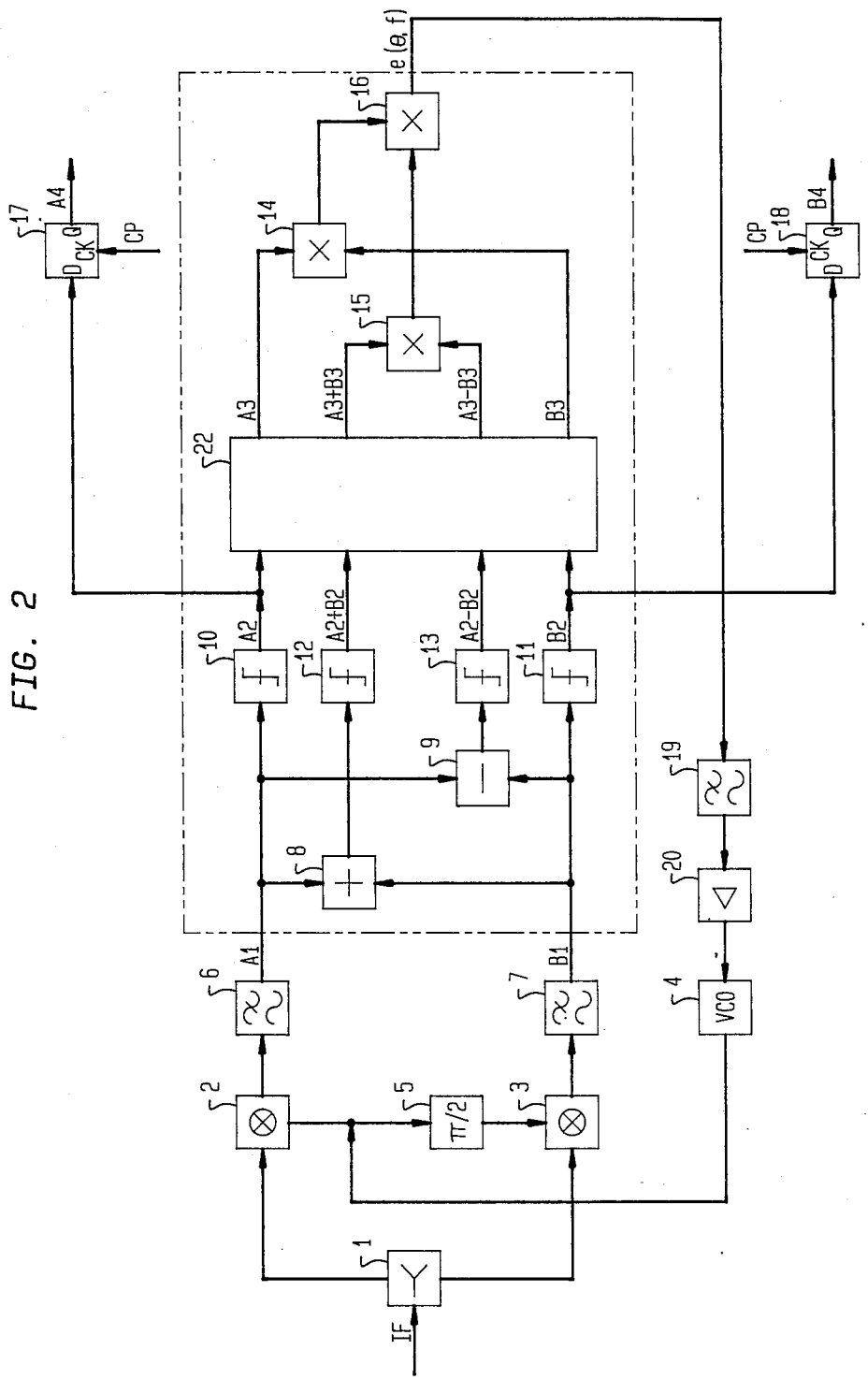
FIG. 2 shows a block diagram of a demodulator in accordance with the present invention.

FIG. 2, in which the same elements as in FIG. 1 are shown with the same numbers, differs from FIG. 1 by the addition of a block 22 having four inputs and four outputs and by the absence of block 21 and adder 30. The circuit of block 22 is inserted between the outputs of the slicers 10, 11, 12 and 13 and the outputs of the multipliers 14 and 15.

The blocks enclosed by the broken line of FIG. 2 illustrate a phase-frequency comparator the, output signal $e(\theta,f)$ of which represent the phase-frequency error signal for control of the local oscillator 4.

The error signal $e(\theta,f)$ generated by the circuit in this configuration compared with the known configuration of FIG. 1 is a function of the phase difference and of the frequency difference between the locally generated carrier and the modulation carrier.

The function of the circuit of block 22 is to process the four signals A2, B2, A2+B2 and A2−B2 in such a manner that in its output signals A3, B3, A3+B3 and A3−B3 there is present information on the carrier frequency (suppressed) of the signal received, i.e. the block 22 gives to the phase-lock loop an added frequency characteristic and also permits extension of the capture range.

Figure 3:
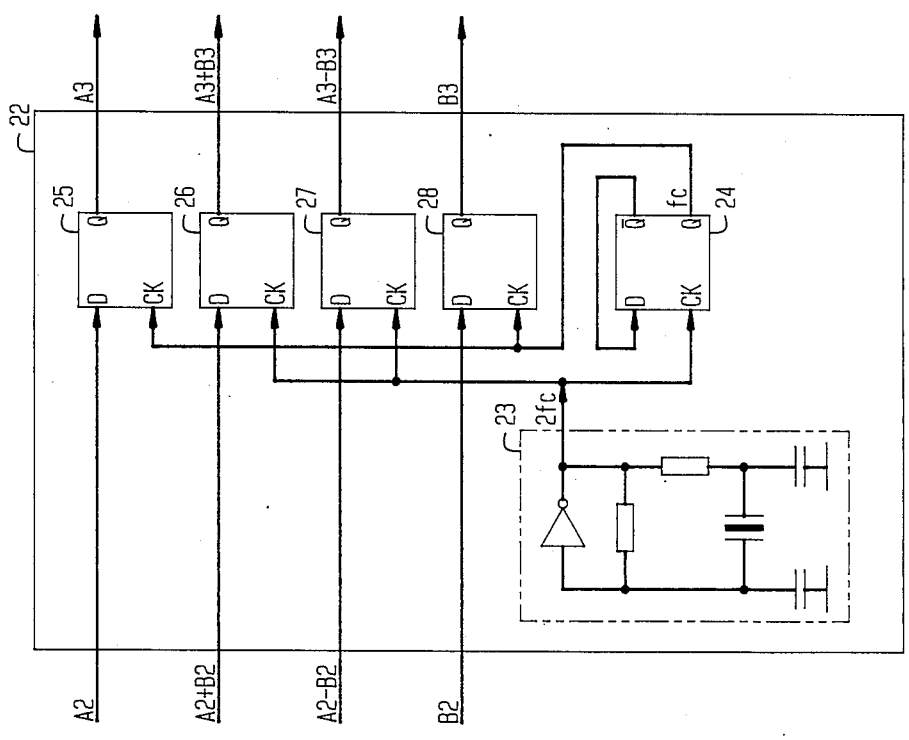
FIG. 3 shows a first hardware implementation of block 22 of FIG. 2.

FIG. 3 represents an embodiment of the circuit shown by block 22 for a QPSK demodulator. Within the block 22 there is included a known oscillator 23 which generates a signal the frequency of which is indicated by 2fc. This signal is sent to the three clock inputs $\overline{CK}$ of three type-D flip-flops 24, 26 and 27. The output $\overline{Q}$ of flip-flop 24 is connected to the input D of said flip-flop 24 to achieve the known configuration of a divide-by-two circuit. Therefore, at the output $\overline{Q}$ of the flip-flop 24 there is present a clock signal at frequency fc which, together with the frequency 2fc, is used for sampling the input signals of the block 22. The output $\overline{Q}$ of the flip-flop 24 is connected to the two clock inputs CK of two flip-flops 25 and 28. The input D of the flip-flop 25 is connected to the output of the slicer 10 while the output Q of said flip-flop is connected to the first input of the multiplier 14. The input D of the flip-flop 28 is connected to the output of the slicer 11 while the output Q of said flip-flop is connected to the second input of the multiplier 14. The input D of the flip-flop 26 is connected to the output of the slicer 12 while the output Q of said flip-flop is connected to the second input of the multiplier 14. The input D of the flip-flop 26 is connected to the output of the slicer 12 while the output Q of said flip-flop is connected to the first input of the multiplier 15. The input D of the flip-flop 27 is connected to the output of the slicer 13 while the output Q of said flip-flop is connected to the second input of the multiplier 15.

Figure 4:
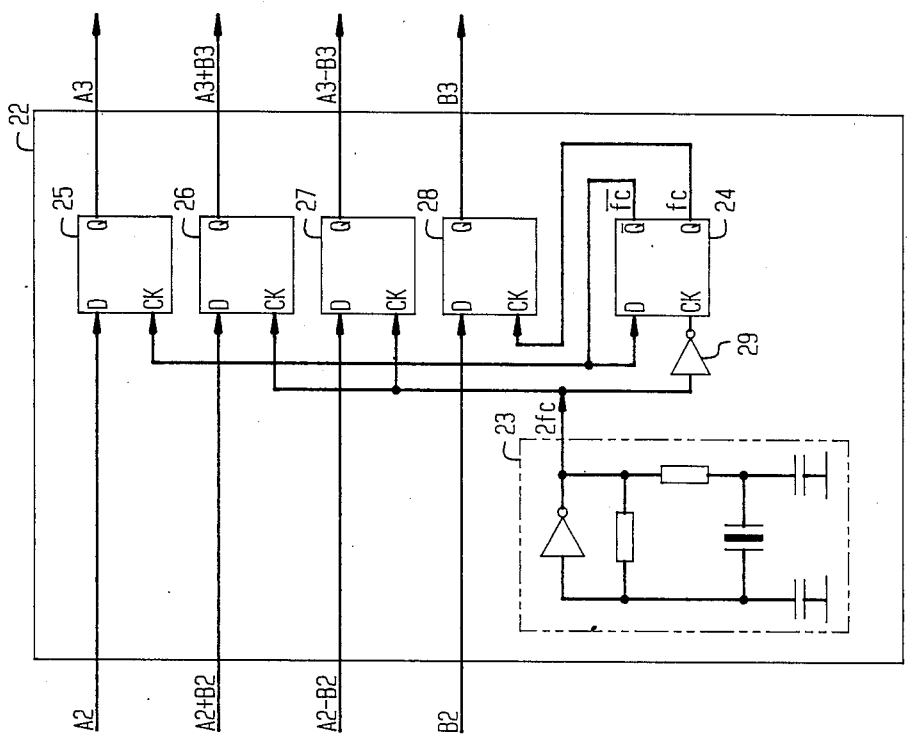
FIG. 4 shows a second hardware implementation of the same 22 of FIG. 2.

FIG. 4 illustrates an embodiment of the circuit of the block 22 for an O-QPSK demodulator and differs from FIG. 3 in that between the output of the oscillator 23 and the clock input CK of the flip-flop 24 an inverter 29 is inserted; and in that the clock signal of the flip-flop 25 is not fc but rather is $\overline{fc}$, i.e. a phase shifted signal by one-half period from fc.

In operation, the circuit of FIG. 3 samples the signals A2 and B2 at frequency fc and the signals A2+B2 and A2−B2 at double frequency, i.e. 2fc. The signals A2+B2 and A2−B2 can be sampled with any frequency that is an even multiple of fc.

Operationally, the circuit of FIG. 4 differs from that of FIG. 3 in that the signal A3 is sampled at frequency $\overline{fc}$, i.e. with a signal in phase opposition compared to the signal with frequency fc. As is known, in an O-QPSK system the two demodulated signals A1 and B1 are phase shifted with each other by a half period so that the respective sampling signals must also be phase shifted by a half period.

In addition, for both solutions as described hereinbefore, fc can be equal to or greater than the symbol frequency fs of the signal received. In the first case there is synchronous sampling and in the second case there is asynchronous sampling.

With synchronous sampling the oscillator 23 will clearly no longer be a free oscillator but will have to be an oscillator controlled by the input signal so that it oscillates at a frequency such that fc=fs. In addition, to avoid the sampling signals at frequency fc or 2fc falling into the transition zone of signals A2, B2, A2+B2 and A2−B2 which are zones devoid of information, a phase shifter is required which will permit regulation of the phase of the sampling signals.

With asynchronous sampling it has been found that the behavior of the circuit depends on the relationship between fc and fs. This behavior is described with reference to FIGS. 5 and 6.

Figure 5:
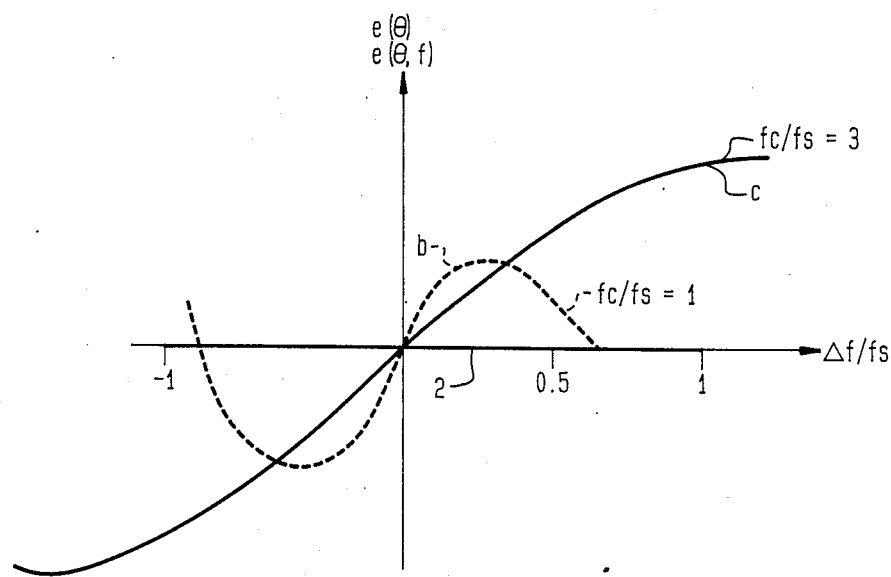
FIG. 5 shows some experimental voltage versus frequency output characteristics of the demodulator, in accordance with the present invention.

FIG. 5 shows the voltage versus frequency open loop output characteristic experimentally taken of the phase-frequency comparator which is a feature of the present invention. Specifically it represents the mean value of voltage $e(\theta,f)$ at the output of the phase-frequency comparator, versus the frequency difference of between the frequency of the local oscillator 4 and the frequency of the carrier (suppressed) of the input signal, normalized with reference to the symbol frequency fs.

FIG. 5 shows three curves indicated with the letters a, b and c. Curve a represents the output characteristic of a phase-only comparator accomplished in accordance with the known art. Curves b and c were obtained from the phase-frequency comparator in accordance with the teachings of the present invention, for different values of fc/fs, specifically for *fc/fs*=1 (synchronous sampling) and for *fc/fs*=3 (asynchronous sampling).

With reference to curve "a," it is apparent that as frequency Δf varies, the output voltage of the known comparator is always zero, i.e. there is no component depending on the Frequency error in the error signal $e(\theta)$.

With reference to the curves "b" and "c," it is apparent that as the frequency Δf varies, the error signal e $(\theta,f)$, which drives the local oscillator for generation of the local carrier at the exact frequency of the signal carrier, varies, preventing false locks. Curves b and c show how the proposed phase-frequency comparator provides an output signal $e(\theta,f)$ strongly dependent on the error frequency Δf and therefore useful for driving the local oscillator in a carrier recovery loop, avoiding false lock occurrences. Curve c also shows a more extensive capture range than curve b. The capture range is represented by the value Δf at which the error signal $e(\theta,f)$ crosses again the horizontal axis.

For an increase in the capture range there is a corresponding reduction of the slope of the curve and hence a reduction in the gain of the phase-frequency comparator. Choice of the sampling frequency will, therefore, depend on the specific characteristics and performances required for demodulation processing.

Figure 6:
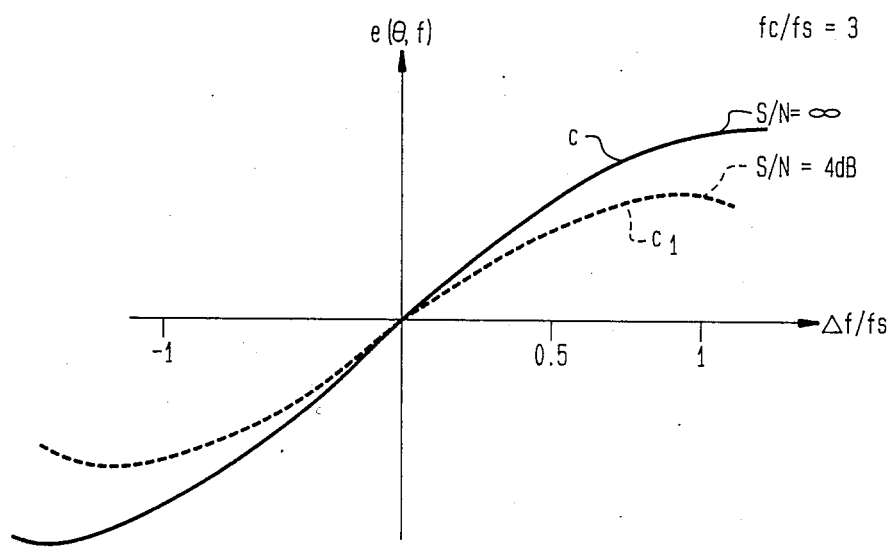
FIG. 6 shows some experimental voltage versus frequency output characteristics of the demodulator, in accordance with the present invention, in the presence of thermal noise.

FIG. 6 shows curve c, which is the same as that of FIG. 5, obtained with *fc/fs*=3 and in the absence of noise at the input of the demodulator (signal/noise ratio S/N=∞), and curve c1 which is also obtained with *fc/fs*=3 with a signal/noise ratio S/N of 4dB. The condition S/N=4 dB is assumed to be the worst case operating condition for a QPSK demodulator, so that the real curves will stay in the area between c and c1 to assure proper operation in all conditions.

As is known, the QAM modulation technique is derived from PSK modulation, having an additional amplitude modulation. Consequently, everything said for the QPSK modulator applies to a QAM demodulator. In particular for recovery of the modulation carrier the same phase-frequency comparator which is the object of the present invention can be used.

The advantages of the method and of the circuit for the acquisition of carrier synchronism for coherent demodulators in accordance with the present invention have been described. Specifically, the demodulators produced in accordance with the invention are free from false locks and have a very extensive capture range obtained without the help of a supplementary search device. Furthermore, by merely varying the sampling frequency fc, it is possible to control within fairly extensive limits the capture range. Lastly, the circuit of the present invention is simple and economical. Being completely digital, the present invention can be readily produced by integrated circuit technology.

It is apparent that numerous variations of the method and circuit of the present invention for acquisition of carrier synchronism for coherent demodulators described herein are possible for those skilled in the art, and are included within the scope of the claims appended hereto.

What is claimed is:

1. A method for acquisition of carrier synchronism in coherent demodulators which receive at their input a modulated signal which is divided into two signals which are multiplied by two signals in quadrature respectively, the resulting signals being then added together and subtracted from each other to obtain a plurality of multiplied signals, including the steps of:
    sampling at least a first (A2) and a second (B2) signal among said plurality of multiplied signals with a first frequency (fc); and
    sampline at least a third (A2+B2) and a fourth signal (A2−B2) among said plurality of multiplied signals with a second frequency (2fc) which is an even multiple of the first frequency (fc), wherein said second sampling frequency (2fc) is double said first sampling frequency, (fc).

2. A method for the acquisition of carrier synchronism in coherent demodulators in accordance with claim 1 wherein said first signal (A2) is sampled with a third frequency (fc) obtained from said first sampling frequency (fc) by a phase shifting of one-half period.

3. A method for the acquisition of carrier synchronism in coherent demodulators which receive at their inputs a phase modulated input signal, comprising the following steps:
    branching out two lines of said phase modulated input signal;
    multiplying the signal on one of said lines with a signal derived from a Voltage Controlled Oscillator (VCO) to obtain a first demulated signal;
    multiplying the signal on the other of said lines with a signal in quadrature with respect to the signal deriving from said VCO to obtain a second demodulated signal;
    summing said first and second demodulated signals to derive a third demodulated signal;
    subtracting said second demodulated signal from said first demodulated signal to obtain a fourth demodulated signal;
    slicing said first, second, third and fourth demodulated signals;
    sampling said first and second demodulated and sliced signals with a first sampling freuqency;
    samping said third and fourth demodulated and sliced signals with a second sampling frequency which is an even multiple of the first frequency;
    multiplying said first, second, third and fourth demodulated sliced and sampled signals to derive an error signal for controlling the VCO.

4. A method for the acquisition of carrier synchronism in coherent demodulators in accordance with claim 3 wherein said first sampling frequency (fc) is equal to the symbol frequency (fs) of the received signal.

5. A method for the acquisition of carrier sychronism in coherent demodulators in accordance with claim 4 wherein the phase of said first sampling frequency (fc) is varied in comparison with the phase of said symbol frequency (fs).

6. A method for the acquisition of carrier synchronism in coherent demodulators in accordance with claim 3 wherein said first sampling frequency (fc) is higher than the symbol frequency (fs) of the received signal.

7. A circuit for the acquisition of carrier synchronization in coherent demodulators which receive at their inputs a phase modulated input signal, comprising:
    a two end brancher for said phase modulated input signal;
    a first multiplier which multiplies the signal on one of said brancher ends with a signal derived from a Voltage Controlled Oscillator (vCO) to obtain a first demodulated signal;
    a second multiplier means which multiplies the signal on the other of said brancher ends with a signal in quadrature with respect to the signal derived from the said VCO, to obtain a second demodulated signal;
    an adder circuit which adds said first and said second demodulated signals to derive a third demodulated signal;
    a subtractor circuit which subtracts said second demodulated signal first demodulated signal to obtain a fourth demodulated signal;
    slicer circuit means which slice said first, second, third and fourth demodulated signals;
    a first and a second sampler means which sample respectively said first and second demodulated and sliced signals with a signal haivng a first sampling frequency;
    a third and fourth sampler means which sample said third and fourth demodulated and sliced signals with a signal having a second sampling frequency which is an even multiple of the first frequency;
    a third multiplier means which multiplies said first, second, third and fourth demodulated sliced and sampled signal to obtain an error signal for controlling said VCO.

8. A circuit for the acquisition of carrier synchronism in coherent demodulators in accordance with claim 7 wherein said samplers are comprised of flip-flop circuit elements.

9. A circuit for the acquisition of carrier synchronism in coherent demodulators in accordance with claim 7 wherein said second sampling frequency (2fc) is generated by an oscillator means and wherein said first sampling frequency (fc) is derived both by said oscillator means and by frequency divider means.

10. A circuit for the acquisition of carrier synchronism in coherent demodulators in accordance with claim 9 wherein said frequency divider means comprises a frequency divide-by-two flip-flop circuit.

11. A circuit for the acquisition of carrier synchronization in coherent demodulators in accordance with claim 7 further comprising phase shifter means to shift the phase of said signal, having a first sampling frequency, by one-half period, for the control of said first sampler when said phase modulated input signal is O-QPSK type.

* * * * *